United States Patent [19]

Miyazaki

[11] Patent Number: 5,218,701

[45] Date of Patent: Jun. 8, 1993

[54] COMMAND FILE PROCESSING AND AUTHORIZING SYSTEM AND METHOD WITH VARIABLE ACCESS LEVELS

[75] Inventor: Takahiro Miyazaki, Kawasaki, Japan

[73] Assignee: Fujitsu Limited, Kawasaki, Japan

[21] Appl. No.: 623,293

[22] Filed: Dec. 6, 1990

[30] Foreign Application Priority Data

Dec. 6, 1989 [JP] Japan .................. 1-316994

[51] Int. Cl.⁵ .................. G06F 13/14; G06F 12/14
[52] U.S. Cl. .................. 395/700; 364/DIG.2; 364/918.7; 364/969.0
[58] Field of Search .................. 395/700, 650

[56] References Cited

U.S. PATENT DOCUMENTS 4,815,031  3/1989  Furukawa .................. 364/900
4,847,803  7/1989  Miayno .................. 364/900

Primary Examiner—Gareth D. Shaw
Assistant Examiner—A. Katbab
Attorney, Agent, or Firm—Staas & Halsey

[57] ABSTRACT

A command file processing system includes a terminal which inputs a password and commands which are to be executed. A command table prestores command names in correspondence with information which indicates passwords authorized to execute the commands. A command made up of the commands are to be executed and are registered in the command file. A judging part judges whether or not the password input from the terminal has authority to execute an arbitrary command which is to be registered in the command file when registering the commands in the command file. The judging part controls the command file creating part to reject the registration of the arbitrary command in the command file when the password has no authority to execute the arbitrary command.

20 Claims, 8 Drawing Sheets

COMMAND FILE PROCESSING AND AUTHORIZING SYSTEM AND METHOD WITH VARIABLE ACCESS LEVELS

BACKGROUND OF THE INVENTION

The present invention generally relates to command file processing systems and methods and command file authorizing systems, and more particularly to command file processing system and method which reject registration of a command which is unauthorized to an operator into a command file when creating the command file and a command file authorizing system which authorizes access to the command file.

Recently, maintenance services for information processing systems are rapidly becoming more advanced and complex. Hence, more advanced skills are required of the maintenance person. On the other hand, the security of the system is also becoming an extremely important factor due to the effects on society.

Accordingly, it is necessary to efficiently carry out the maintenance and also ensure security by using passwords and the like so as to permit access to the system only to authorized person.

Conventionally, in order to ensure security of the system, the authorization to execute a command is restricted by use of the password so that the system is protected from a human fault such as an erroneous operation. In other words, in order to ensure security of the system, each maintenance person has a password known only to him, and the password is first input when inputting the command. The system then judges whether or not a command may be input by use of the password and the command is executed only when the password is authorized to execute the command.

As an effective means for efficiently carrying out a routine maintenance service, there is the command file function which collects a series of commands into one file and executes the commands in a batch. In the case of the command file in which a plurality of commands are collected into one file, it is inconvenient from the point of view of operation to input the password every time each registered command within the command file is to be executed. For this reason, the password is input only once when executing the command file, and the password is successively collated with authorizations of the commands within the command file when executing the commands. Consequently, when a command which is unauthorized by the password is registered within the command file, the execution of this command is rejected even during the execution of the command file.

In addition, some systems have an access level assigned to each command. In other words, commands having certain access levels are only accessible by the password of a skilled person and not by the password of a non-skilled person. In such systems, the command file itself needs to keep, in addition to the authority to execute the commands, the correspondence with the authorized passwords, that is, the authority to execute the command file. In this case, only the password which is registered at the time of creating the command file is authorized to execute the command file, and this command file cannot be executed when the person who created the command file is not present.

According to the prior art, an access level is assigned to each command depending on the importance of the command. For example, an access level which is assigned to a command such as "display" is a non-skilled level which can be executed by anyone, that is, even a non-skilled person is authorized to execute the command having the non-skilled level. On the other hand, an access level which is assigned to a command which corrects or modifies the command of the command file, a command which requires a high-level knowledge, a command which is important from the point of view of security of the system or the like is a skilled level which can only be executed by a skilled person, that is, an authorized person who is authorized to execute the command having the skilled level. The provision of such access levels is essential to maintain the system security, however, various problems are introduced by the provision of such access levels.

For example, when creating a command file of typical daily work, there are cases where a command which can only be executed by a password corresponding to the skilled level is included in the series of work of the command file. In such cases, when this command file is executed by a password corresponding to the non-skilled level, the command which can only be executed by the password corresponding to the skilled level is encountered during the execution of the command file and the execution of this command is unauthorized. As a result, there is a problem in that the work of the command file may be incomplete.

On the other hand, when there is a need to register in the command file a command which can only be executed by the password corresponding to the skilled level, this command file can only be created and be executed by the skilled person. However, the number of skilled persons especially in the case of large scale systems is limited, and there is a problem in that the important but typical daily work may be hindered if the skilled person is not present.

SUMMARY OF THE INVENTION

Accordingly, it is a general object of the present invention to provide a novel and useful command file processing system, command file authorizing system and command file processing method, in which the problems described above are eliminated.

Another and more specific object of the present invention is to provide a command file processing system comprising input means for inputting a password and commands which are to be executed, -a command table which prestores command names in correspondence with information which indicates passwords authorized to execute the commands, command file creating means coupled to the input means for creating a command file which is made up of the commands which are to be executed and are registered in the command file, and judging means coupled to the input means, the command table and the command file creating means for judging whether or not the password input from the input means has authority to execute an arbitrary command which is to be registered in the command file when registering the commands in the command file, where the judging means includes means for controlling the command file creating means to reject the registration of the arbitrary command in the command file when the password has no authority to execute the arbitrary command. According to the command file processing system of the present invention, it is simply necessary to collate the input password and the access level of the command file itself when executing the command file, and it is unnecessary to collate the access levels of each of the commands of the command file. For this reason, it is possible to prevent the execution of, the command file from becoming incomplete, thereby improving both the reliability and security of the system.

Still another object of the present invention is to provide a command file authorizing system comprising input means for inputting a password and commands which are to be executed, a command table which prestores command names in correspondence with information which indicates passwords authorized to execute the commands, command file creating means coupled to the input means for creating a command file which is made up of the commands which are to be executed and are registered in the command file, judging means coupled to the input means, the command table and the command file creating means for judging whether or not the password input from the input means has authority to execute an arbitrary command which is to be registered in the command file when registering the commands in the command file, and a command file storage coupled to the command file creating means and the judging means for storing the command file which is created by the command file creating means, where the command file storage includes a first storage part for storing a password which is used at a time when the command file is created by the command file creating means, and a second storage part for storing each command the password input from the input means has authority to execute to be registered in the command file when registering the commands in the command file. According to the command file authorizing system of the present invention, a skilled person may authorize a non-skilled person to execute a command file which is originally only authorized for execution by the skilled person. For this reason, it is possible to carry out a maintenance operation even when the skilled person is not present. The security of the system can be maintained by not authorizing correction and modification of the command file to the non-skilled person.

A further object of the present invention is to provide a command file processing method comprising the steps of inputting a password and commands which are to be executed, storing command names in a command table in correspondence with information which indicates passwords authorized to execute the commands, creating a command file which is made up of the commands which are to be executed and are registered in the command file, judging whether or not the input password has authority to execute an arbitrary command which is to be registered in the command file when registering the commands in the command file, and rejecting the registration of the arbitrary command in the command file when the password has no authority to execute the arbitrary command.

Other objects and further features of the present invention will be apparent from the following detailed description when read in conjunction with the accompanying drawings.

DESCRIPTION OF THE PREFERRED EMBODIMENTS

Figure 1:
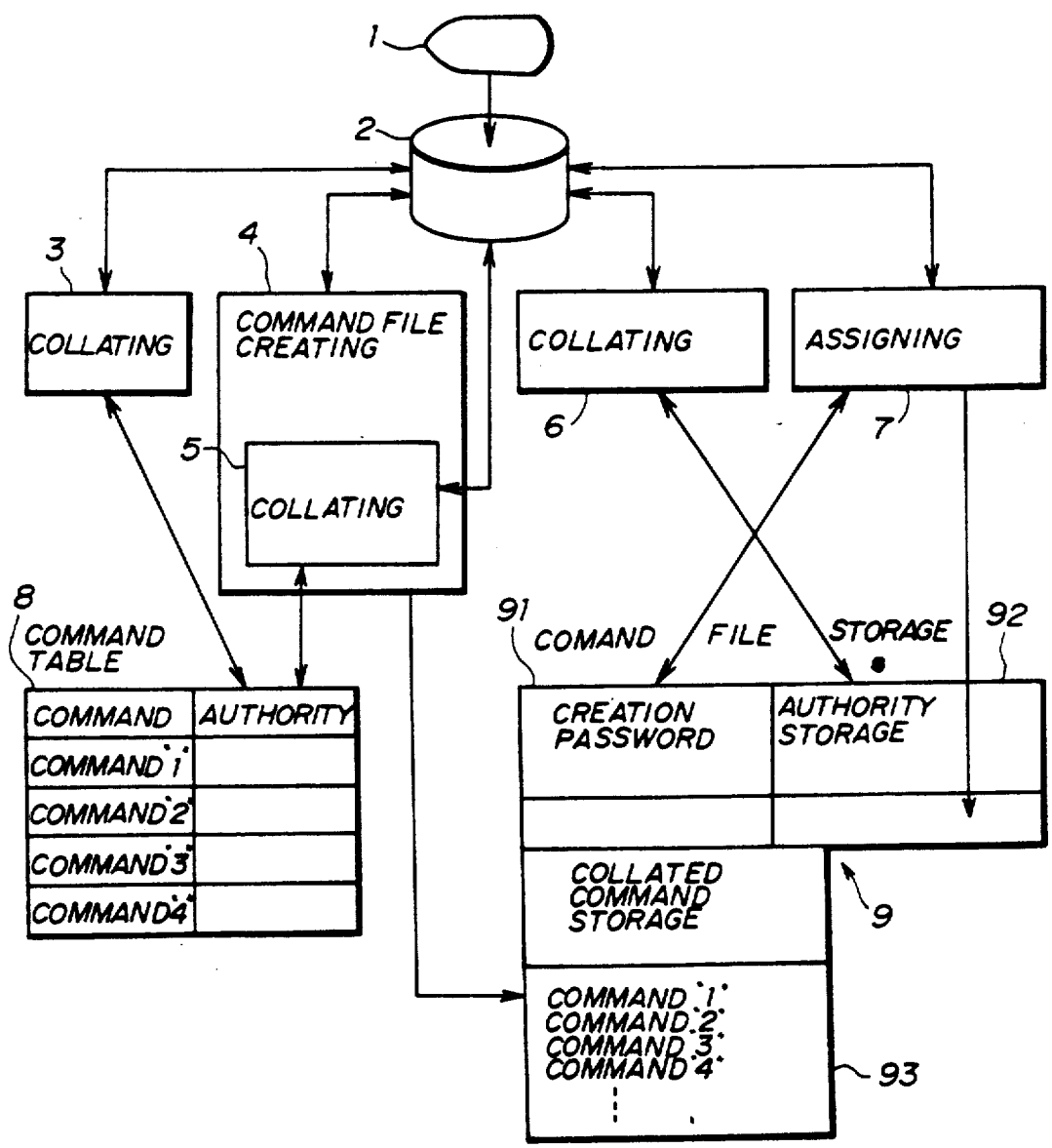
FIG. 1 is a diagram for explaining an operating principle of the present invention.

First, a description will be given of the operating principle of the present invention, by referring to FIG. 1. An information processing system shown in FIG. 1 includes a terminal 1, an input password storage 2, an authority collating part 3, a command file creating part 4, an authority collating part 6, an authority assigning part 7, a command table 8 and a command file storage 9.

The terminal 1 is used to input a password, command and the like to the information processing system. The input password storage 2 stores the password which is input from the terminal 1 by the maintenance person. The command table 8 registers in the form of a table the names of commands and the passwords which are authorized to execute each command. The authority collating part 3 collates the input password with the passwords of the command table 8 to determine whether or not the input password is authorized to execute the command which is to be executed, and permits execution of the command when it is determined that the input password has the authority to execute the command.

The command file creating part 4 describes a series of groups of commands which are to be executed and registers the commands as a command file in the command file storage 9. The command file storage 9 includes a storage part 91 for storing a password which is used when creating the command file, a storage part 92 for storing an authority, and a storage part 93 for storing collated commands.

An authority collating part 5 is provided within the command file creating part 4. The authority collating part 5 collates the authority of the input password with the data of the command table 8 when creating the command file, so as to determine whether or not the input password has the authority to execute the command which is to be registered.

The authority collating part 6 collates the input password with the authority stored in the storage part 92 of the command file storage 9 when executing the command file, so as to determine whether or not the input password has the authority to execute the command file. The authority assigning part 7 writes in the storage part 92 of the command file storage 9 an authority which is to be assigned to a password.

When there is a request from the command file creating part 4 to register a command in the command file storage 9, the authority collating part 5 within the command file creating part 4 refers to the command table 8 to determine whether or not the input password has the authority to execute the command which is to be registered. When the input password has the authority to execute the command which is to be registered, the authority collating part 5 registers this command in the storage part 93 of the command file storage 9 as a collated command. On the other hand, when the input password does not have the authority to execute the command which is to be registered, the registration of this command into the command file is rejected, that is, not made. At the same time, the input password is written into the storage parts 91 and 92 of the command file storage 9.

The authority assigning part 7 writes into the storage part 92 of the command file storage 9 a password which is other than the password which is input at the time the command file is made and to which the authority is to be assigned, only when the input password at the time when the authority is assigned is the same as the password written in the storage part 91 of the command file storage 9.

When the command file creating part 4 registers the command in the command file within the command file storage 9, the authority collating part 5 of the command file creating part 4 refers to the command table 8 to determine whether or not the input password has the authority to execute the command which is to be registered. The authority collating part 5 registers this command in the storage part 93 of the command file storage 9 as a collated command only when the input password has the authority to execute the command which is to be registered. On the other hand, when the input password does not have the authority to execute the command which is to be registered, the registration of this command into the command file is rejected, that is, not made. At the same time, the input password is written into the storage parts 91 and 92 of the command file storage 9. For this reason, when executing the command file, the authority collating part 6 merely collates the input password and the password stored in the storage part 92. As a result, it is possible to execute the command file while maintaining the security and the execution will not end abnormally. In addition, it is unnecessary for the authority collating part 3 to collate the input password every time a collated command group within the command file is executed.

The authority assigning part 7 writes into the storage part 92 of the command file storage 9 a password which is other than the password which is input at the time the command file is made and to which the authority is to be assigned, only when the input password at the time when the authority is assigned is the same as the password written in the storage part 91 of the command file storage 9. Accordingly, it is possible to assign the authority to other passwords. In other words, even when the input password is different from the password which is used at the time the command file is created, the authority collating part 6 permits the execution of the command file by the input password when this input password matches the password which is stored in the storage part 92 of the command file storage 9. As a result, even when the execution of the command file is authorized only to the password of the skilled person who created the command file, the skilled person (that is, creator of the command file) by his wish may assign authority to a password of a non-skilled person so that the non-skilled person may execute the command file in place of the skilled person as if the skilled person were present. The authority is assigned to the password of the non-skilled person with regard only to the execution of the command file. The security of the system is maintained because the password of the non-skilled person has no authority to correct or modify the command file, and only the password of the skilled person has the authority to correct or modify the command file.

Figure 2:
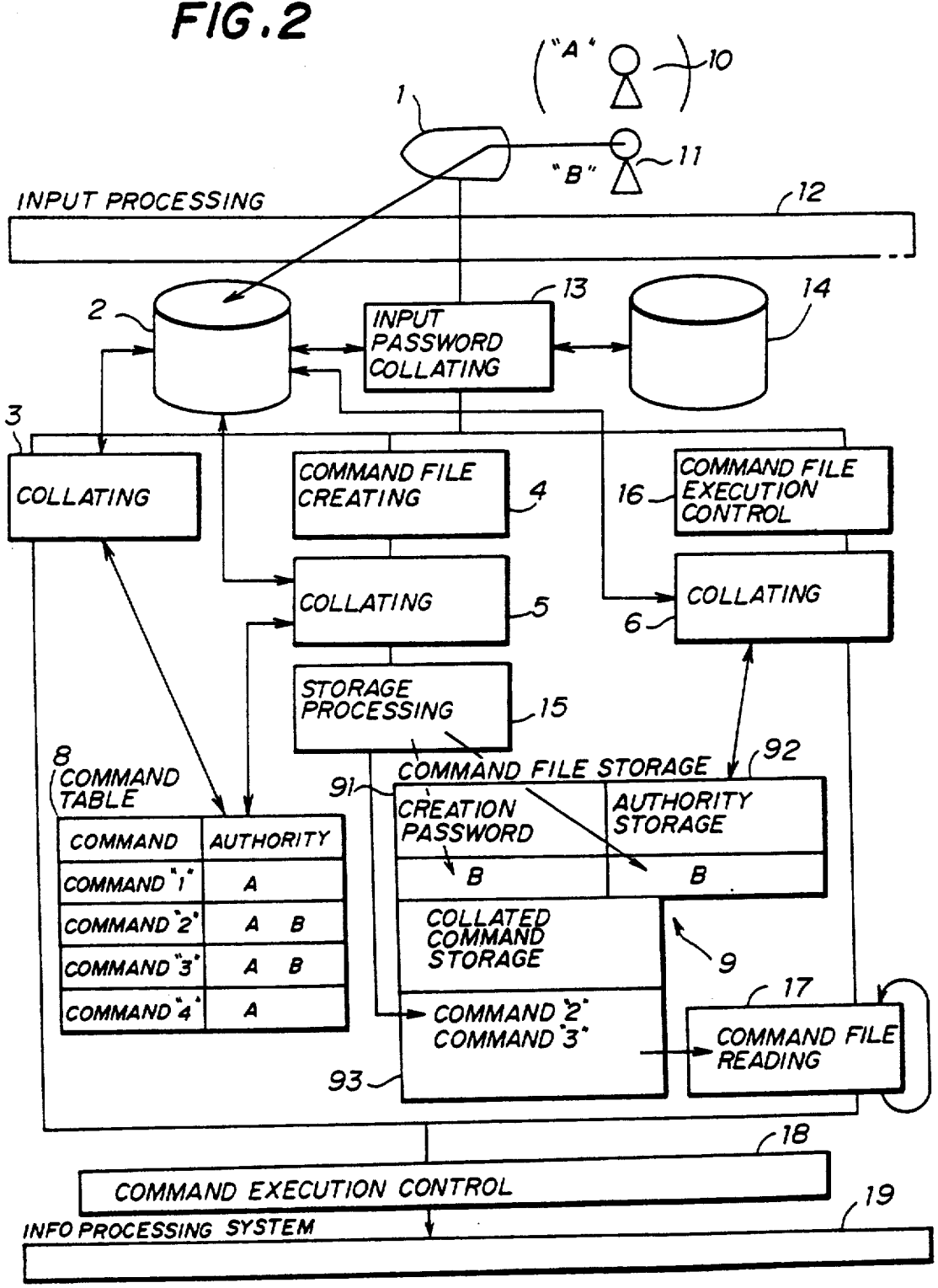
FIGS. 2 and 3 are system block diagrams respectively showing an embodiment of the present invention.
Figure 3:
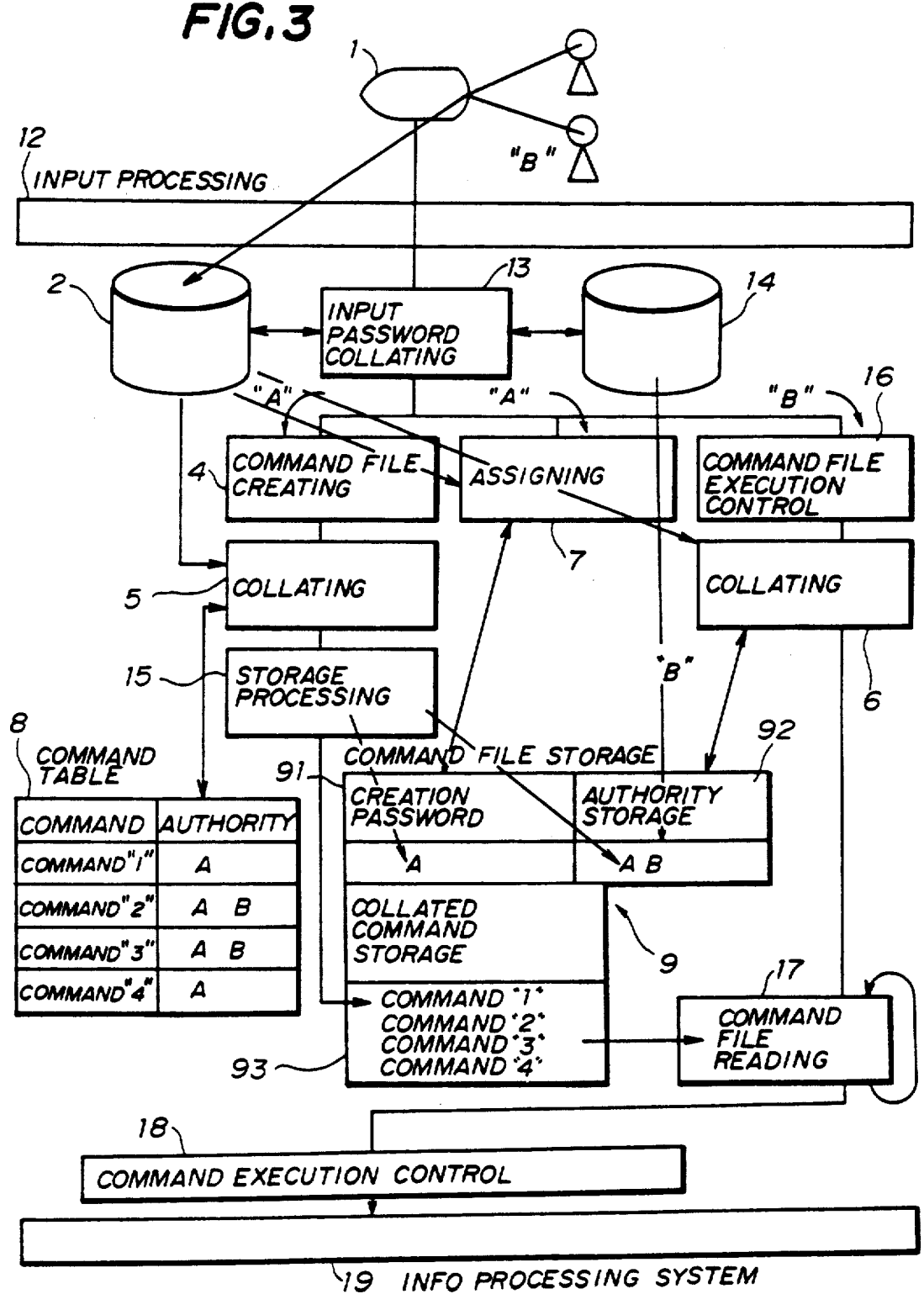

Next, a description will be given of an embodiment of the present invention, by referring to FIGS. 2 and 3. FIGS. 2 and 3 respectively show a command and command file control apparatus of an information processing system. FIGS. 2 and 3 show the same embodiment, but FIG. 2 shows the data flow when executing a command, creating a command file and executing the command file, while. FIG. 3 shows the data flow when creating the command file, assigning authority and executing the command file by the assigned authority. In FIGS. 2 and 3, a solid line with an arrow indicates the referring relationship of data, while a bold solid line with an arrow indicates the data flow. Furthermore, in FIGS. 2 and 3, those parts which are the same as those corresponding parts in FIG. 1 are designated by the same reference numerals.

A skilled person 10 has a password A and a non-skilled person 11 has a password B. An input processing part 12 receives and processes a password and a command which are input from the terminal 1. A registered password storage 14 stores passwords which are authorized to attend to the maintenance of the system. An input password collating part 13 collates the password input from the terminal 1 with the registered passwords in the registered password storage 14.

A storage processing part 15 writes the input password in the storage parts 91 and 92 of the command file storage 9 when creating (that is, registering) the command file and writes the command in the storage part 93 of the command file storage 9. A command file execution control part 16 receives a command file execution request from the terminal 1. A command file reading part 17 successively reads and executes the commands stored in the storage part 93 of the command file storage 9 one by one. A command execution control part 18 starts the command with respect to an information processing system 19 which is the subject of the maintenance.

For example, the skilled person 10 is authorized to execute all commands of the system, while there are restrictions on the non-skilled person 11 when executing the commands of the system. Accordingly, the command table 8 stores the access level for each of the commands of the system. For example, the command table 8 prestores information indicating that the passwords A and B are authorized to execute the commands "2" and "3" and only the password A is authorized to execute the commands "1" and "4".

The input processing part 12 stores the input password in the input password storage 2. In addition, prior to the storage of the input password, the input password collating part 13 checks whether or not to authorize the maintenance of the system. Hence, the passwords A and B are prestored in the registered password storage 14. When the input password is not stored in the registered password storage 14, the subsequent input is rejected and the input password will not be stored in the input password storage 2.

The command execution control part 18 starts the execution of the command. The command which is started is supplied from the authority collating part 3 or the command file reading part 17.

In other words, as shown in FIG. 2, the commands are input from the terminal 1 when the commands are executed one by one, and each command is executed after the authority of the input password for each concerned command is checked by the authority collating part 3. The command table 8 is used for the collating when checking the authority of the input password. Accordingly, the password A has the authority to execute the command "1" but the password B has no authority to execute the command "1". Both the passwords A and B have the authority to execute the command "2".

On the other hand, as shown in FIGS. 2 and 3, when executing the commands as the command file, the command is not input from the terminal 1 and the authority collating part 6 checks whether or not the input password has the authority to execute the command file by referring to the contents of the storage part 2. Thereafter, the commands are read out one by one from the storage part 93 of the command file storage 9 by the command file reading part 17 and supplied to the command execution control part 18. When executing the commands as the command file, that is, in the case where the command is started from the command file execution control part 16, the collating by the authority collating part 3 for the purpose of checking the authority is not carried out for every command. Instead, the authority collating part 6 carries out the collating to check the authority to execute the command file. As a rule, only the creator, that is, only the password which is used at the time the command file is created, is authorized to execute the command file. However, as will be described later, the password (B in FIG. 3) which is assigned authority by the creator, password (A in FIG. 3) can as an exception execute the command file.

The command file is created by inputting the commands from the terminal 1 to the command file creating part 4 and storing the commands in the command file storage 9 by the storage processing part 15. Prior to this creation of the command file, the authority collating part 5 collates the authority of the input password with each of the commands by referring to the command table 8. This collating by the authority collating part 5 is carried out when registering the commands, while the collating by the other authority collating parts 3 and 6 are carried out when executing the commands. As a result of this collating, the registration of a command is rejected by the authority collating part 5 when the input password does not have the authority to execute this command. Hence, when executing the command file, it is only necessary to check the authority of the input password once with respect to the command file.

As shown in FIG. 2, when the input password is B, it is possible to register the commands "2" and "3", but the registration of the commands "1" and "4" will be rejected. As shown in FIG. 3, when the input password is A, all of the commands "1" through "4" can be registered.

At the same time as the registration of the commands in the storage part 93 of the command file storage 9, the input password is stored in the storage parts 91 and 92 of the command file storage 9, thereby completing the command file within the command file storage 9. Accordingly, the input password used at the time of creating the command file is stored as the creation password which has the authority to execute the command file.

As shown in FIG. 3, the authority to execute the command file is assigned by when the authority assigning part 7 stores the password (B in FIG. 3) in the storage part 92 of the command file storage 9. The password to be stored in the storage part 92 is input from the terminal 1 to the authority assigning part 7. The authority assigning part 7 checks whether or not the input password matches the password which is stored in the storage part 91 of the command file storage 9 and stores the input password in the storage part 92 only when the passwords match. A reference is made to the registered password storage 14 when the authority assigning part 7 makes the above described check. In other words, the password which is stored in the storage part 92 is limited to the password which is prestored in the registered password storage 14, and the registration into the storage part 92 of a password which is not prestored in the registered password storage 14 is rejected.

As shown in FIG. 3, when the command file includes the command "1" or "4", the password B originally does not have the authority to execute such a command. However, when the creator assigns to the password B the authority to execute the commands "1" and "4", it becomes possible to execute the command file using the password B.

The command file of the command file storage 9 shown in FIG. 2 is different from the command file of the command file storage 9 shown in FIG. 3. The command file of the command file storage 9 shown in FIG. 2 is created by use of the password B and includes the commands "2" and "3", and only the password B has the authority to execute this command file. On the other hand, the command file of the command file storage 9 shown in FIG. 3 is created by use of the password A and includes the commands "1" through "4", and the passwords A and B have the authority to execute this command file.

Figure 4:
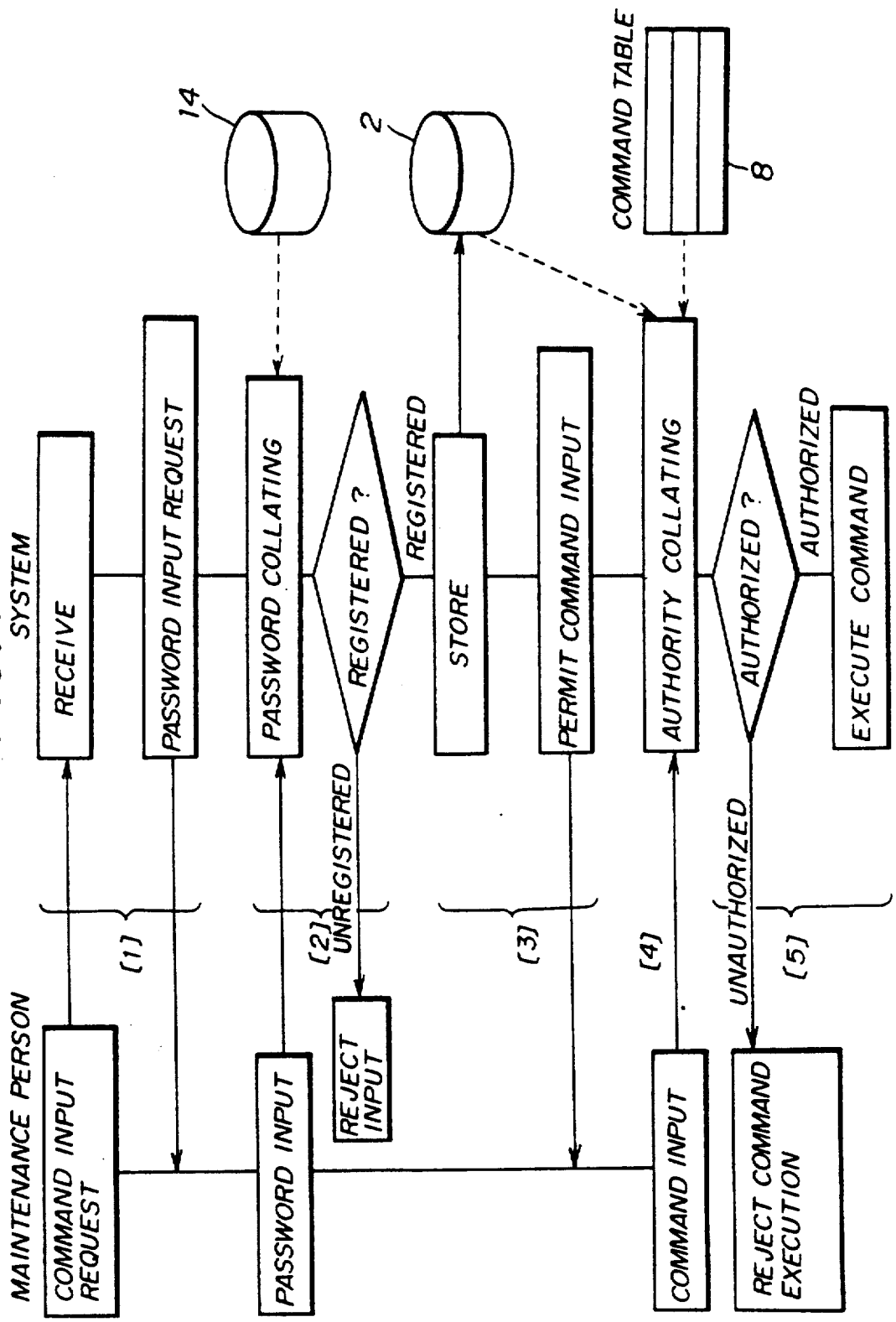
FIG. 4 is a flow chart for explaining a command executing process.

FIG. 4 is a flow chart for explaining the process of executing the commands one by one in the embodiment.

[1] When the maintenance person 10 or 11 inputs a command input request from the terminal 1, the input processing part 12 returns a password input request to the terminal 1 so as to recognize whether or not the maintenance person 10 or 11 is authorized to carry out the maintenance operation.

[2] When the maintenance person 10 or 11 inputs a password from the terminal 1, the input password collating part 13 refers to the registered password storage 14 and collates the input password which is received via the input processing part 12 with the registered passwords in the registered password storage 14.

[3] When the input password is registered in the registered password storage 14, the input processing part 12 stores the input password in the input password storage 2 and permits input of command.

[4] When the maintenance person 10 or 11 who is permitted the input of command, inputs a command which is to be executed via the terminal 1, the authority collating part 3 takes over control. The authority collating part 3 retrieves the command table 8 and checks by collating whether or not the input password has the authority to execute the input command which is to be executed.

[5] When the input password has the authority to execute the input command, the command execution control part 18 takes over the control and executes the input command. On the other hand, when the input password does not have the authority to execute the input command, the execution of the input command is rejected.

Particularly, when the input password is B as shown in FIG. 2 and the input command is the command "2", for example, the input command is actually executed because the input password B has the authority to execute the command "2". On the other hand, when the input password is B and the input command is the command "1", the execution of the command "1" is rejected because the password B does not have the authority to execute the command "1". When the input password is A, the input command is executed regardless of which one of the commands "1" through "4" is the input command.

Figure 5:
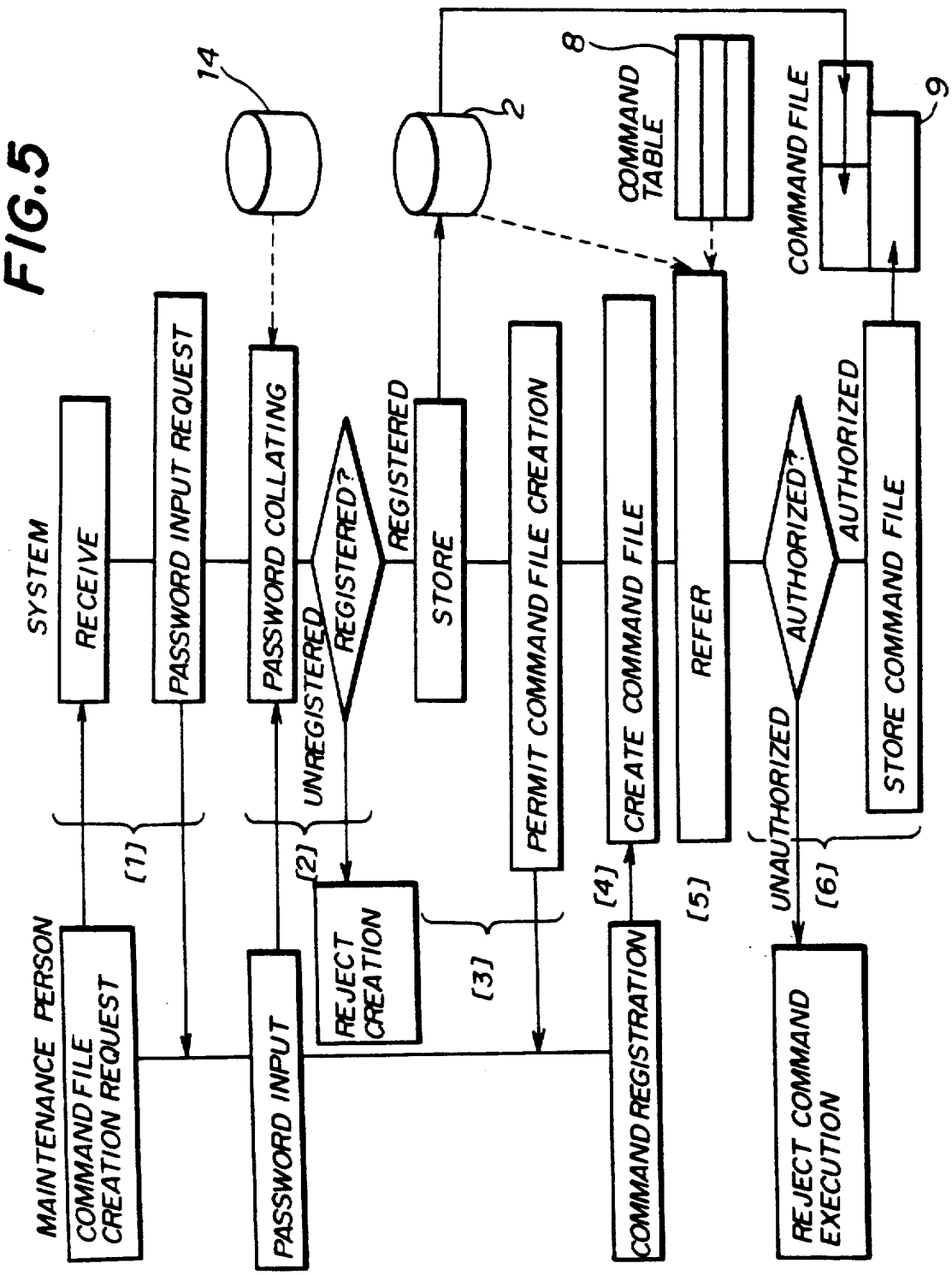
FIG. 5 is a flow chart for explaining a command file creating process.

FIG. 5 is a flow chart for explaining the process of creating a command file in the embodiment.

[1] When the maintenance person 10 or 11 inputs a command file creation request from the terminal 1, the input processing part 12 returns a password input request to the terminal 1 so as to recognize whether or not the maintenance person 10 or 11 is authorized to carry out the maintenance operation.

[2] When the maintenance person 10 or 11 inputs a password from the terminal 1, the input password collating part 13 refers to the registered password storage 14 and collates the input password which is received via the input processing part 12 with the registered passwords in the registered password storage 14.

[3] When the input password is registered in the registered password storage 14, the input processing part 12 stores the input password in the input password storage 2 and permits creation of a command file.

[4] When the maintenance person 10 or 11 who is permitted the creation of the command file inputs from the terminal 1 a group of commands which are to be executed, the authority collating part 3 supplies the group of commands to the command file creating part 4 so as to create the command file.

[5] The authority collating part 5 retrieves the command table for each of the commands of the and carries out a collating function to determine whether or not the input password has the authority to execute each of the commands of the command file.

[6] When the input password has the authority to execute each of the commands of the command file, the command file processing part 15 takes over the control and stores each of the commands of the command file in the storage part 93 of the command file storage 9. In other words, the commands are registered in the command file. On the other hand, when the input password does not have the authority to execute each of the commands of the command file, the registration of the commands in the command file is rejected.

Particularly, when the input password is B as shown in FIG. 2 and the input command is the command "2", for example, the input command is actually registered because the input password B has the authority to execute the command "2". On the other hand, when the input password is B and the input command is the command "1", the registration of the command "1" is rejected because the password B does not have the authority to execute the command "1". When the input password is A, the input command is registered regardless of which one of the commands "1" through "4" is the input command.

In the step [6], the command file processing part 15 stores in the storage parts 91 and 92 of the command file storage 9 the password which is stored in the input password storage 2.

Particularly, in the case shown in FIG. 2, the input password B is stored in the storage parts 91 and 92, and this input password B is regarded as the creation password which has the authority to execute the command file. Similarly, in the case shown in FIG. 3, the input password A is stored in the storage parts 91 and 92, and this input password A is regarded as the creation password which has the authority to execute the command file.

Figure 6:
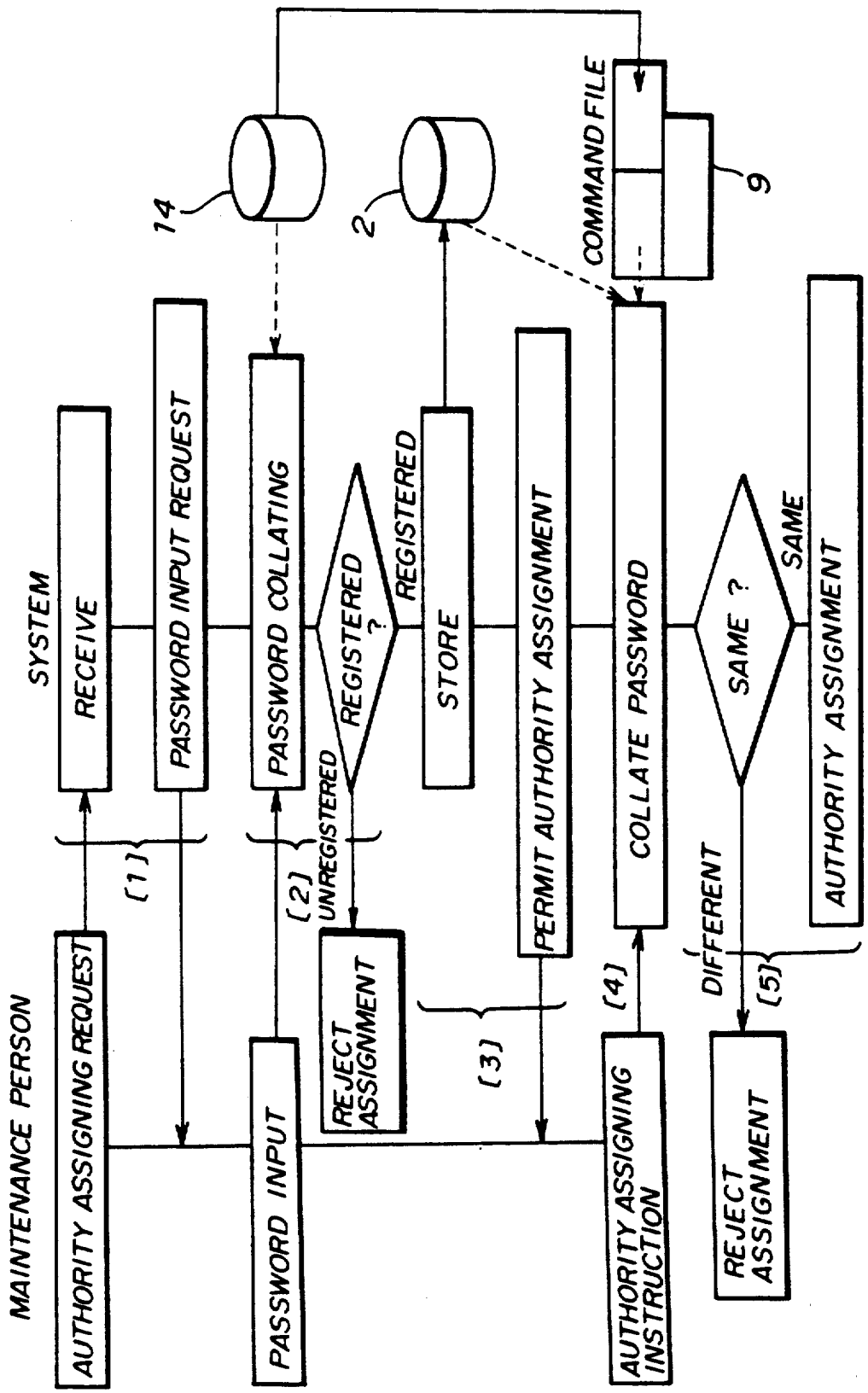
FIG. 6 is a flow chart for explaining a process for authorizing execution of a command file.

FIG. 6 is a flow chart for explaining the process of assigning authority to execute command file in the embodiment.

[1] When the maintenance person 10 or 11 inputs an authority assigning request from the terminal 1, the input processing part 12 returns a password input request to the terminal 1 so as to recognize whether or not the maintenance person 10 or 11 is authorized to carry out the maintenance operation.

[2] When the maintenance person 10 or 11 inputs a password from the terminal 1, the input password collating part 13 refers to the registered password storage 14 and collates the input password which is received via the input processing part 12 with the registered passwords in the registered password storage 14.

[3] When the input password is registered in the registered password storage 14, the input processing part 12 stores the input password in the input password storage 2 and permits assignment of authority.

[4] When the maintenance person 10 or 11 who is permitted the assignment of authority inputs from the terminal 1 an instruction which indicates which password is to be given authority to execute which command file, this instruction is supplied to the authority assigning part 7 via the input processing part 12. Responsive to this instruction, the authority assigning part 7 collates the input password stored in the input password storage 2 with the creation password stored in the storage part 91 to determine whether or not the two passwords match.

[5] When the collated passwords match, the authority assigning part 7 determines whether or not the password which is to be assigned the authority to execute the command file is stored in the registered password storage 14. When the password which is to be assigned the authority to execute the command file is stored in the registered password storage 14, this password is stored in the storage part 92 of the command file storage 9. In other words, the authority to execute the command file is assigned to this password. On the other hand, when the password which is to be assigned the authority to execute the command file is not stored in the registered password storage 14, the assignment of the authority is rejected. Furthermore, the assignment of the authority is also rejected when the collated passwords do not match.

Particularly, in the case shown in FIG. 3, the input password A which is used when creating the command file, instructs assignment of the authority to execute the command file to the password B, the password B is stored in the storage part 92 of the command file storage 9.

Figure 7:
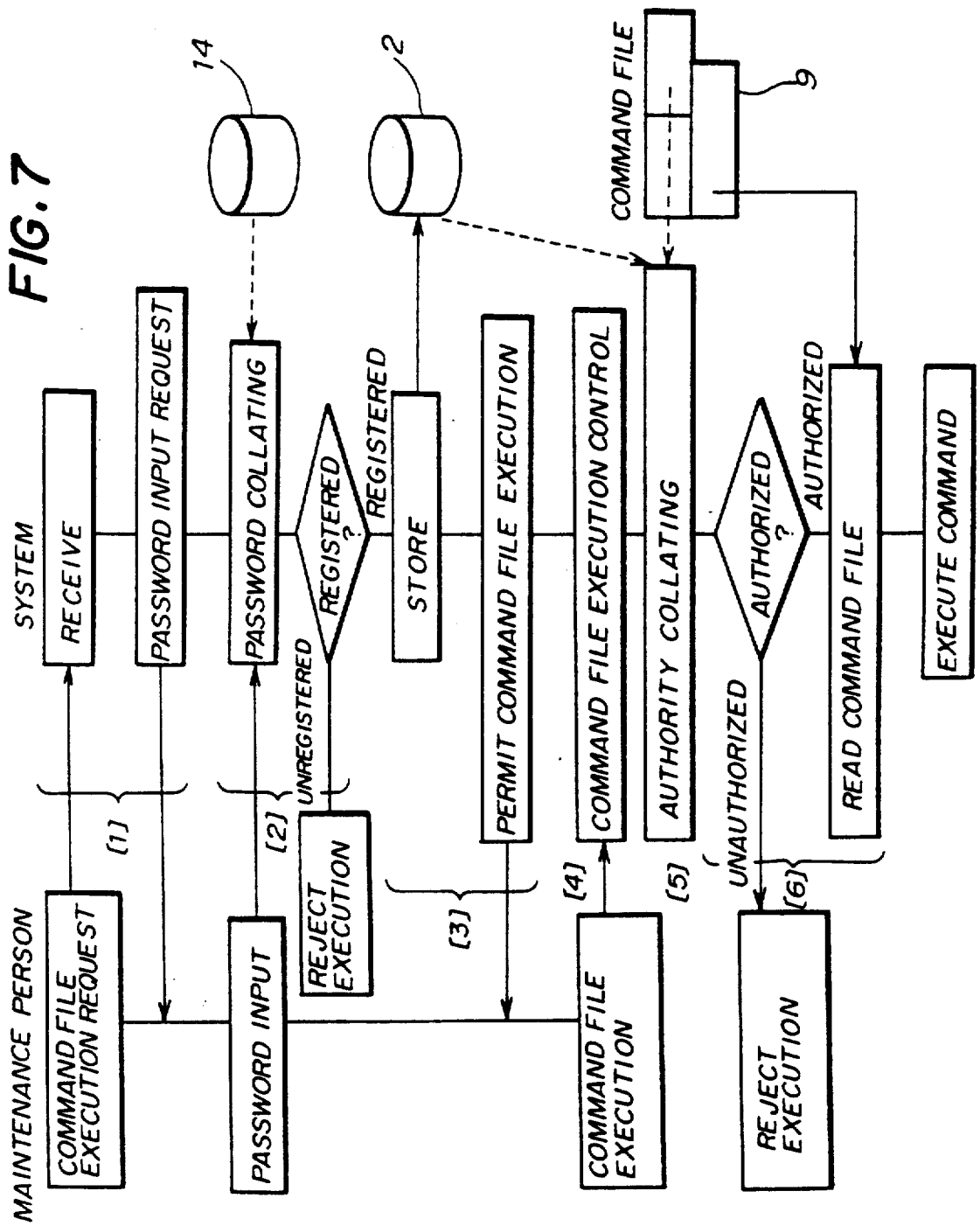
FIG. 7 is a flow chart for explaining a command file executing process.

FIG. 7 is a flow chart for explaining the process of executing command file in the embodiment.

[1] When the maintenance person 10 or 11 inputs a command file execution request from the terminal 1, the input processing part 12 returns a password input request to the terminal 1 so as to recognize whether or not the maintenance person 10 or 11 is authorized to carry out the maintenance operation.

[2] When the maintenance person 10 or 11 inputs a password from the terminal 1, the input password collating part 13 refers to the registered password storage 14 and collates the input password which is received via the input processing part 12 with the registered passwords in the registered password storage 14.

[3] When the input password is registered in the registered password storage 14, the input processing part 12 stores the input password in the input password storage 2 and permits execution of the command file.

[4] When the maintenance person 10 or 11 who is permitted the execution of the command file inputs (specifies) from the terminal 1 a command file which is to be executed, the input command file is supplied to the command file execution control part 16 via the input processing part 12.

[5] With respect to the specified command file, the authority collating part 6 retrieves the storage part 92 and carries out a collating function to determined whether or not the input password has the authority to execute this command file.

[6] When the input password has the authority to execute the specified command file, the command file reading part 17 takes over the control, and the commands are read out from the storage part 93 in the stored sequence and executed by the command execution control part 18. On the other hand, when the input password does not have the authority to execute the specified command file, the execution of this command file is rejected.

Particularly, in the case shown in FIG. 2, the password B is stored in the storage part 92 in the step [6] shown in FIG. 5. Accordingly, in this case, only the password B has the authority to execute the specified command file, and even the password A of the skilled person 10 cannot execute this specified command file. In other words, only the creator of the specified command file has the authority to execute this command file.

On the other hand, in the case shown in FIG. 3, the authority is assigned by the process shown in FIG. 6. Hence, the password B which is other than the creation password A is authorized to execute the specified command file. In other words, as shown in FIG. 3, the storage part 92 stores in addition to the creation password A the password B which is assigned the authority to execute the command file. In this case, in the step [5] shown in FIG. 7, it is determined by the collating that the password B also has the authority to execute the specified command file. Accordingly, the password B is authorized to execute the command file which includes the commands "1" and "4" although the password B originally does not have the authority to execute the commands "1" and "4".

In the case shown in FIG. 2, the password A is similarly authorized to execute the command file by assigning the authority to the password A.

Next, a description will be given of a modification of the above described embodiment. In the described embodiment, the command table 8 stores the commands in correspondence with the passwords having the authority to execute the commands. However, the command table 8 may store the commands in correspondence with access levels with which the commands may be executed. In other words, when there are 11 access levels "0" through "10", for example, a command having an access level "9" can only be executed by a password having an access level "9" or higher ("10" in this case).

Figures 8, 9:
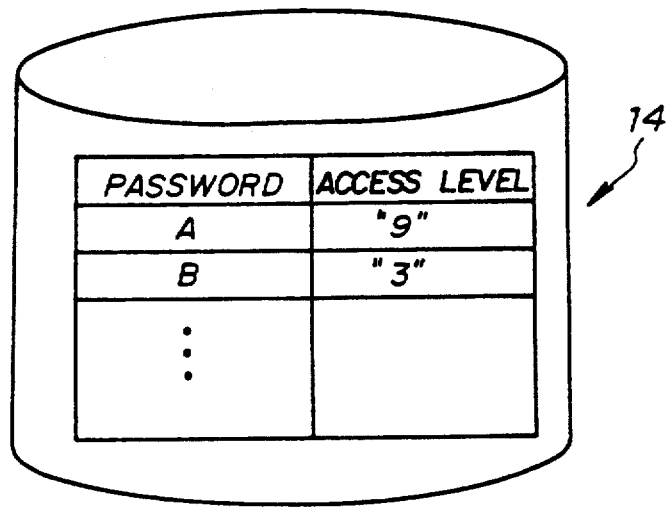
FIGS. 8 and 9 are diagrams respectively showing an essential part of a modification of the embodiment of the present invention.

FIG. 8 shows the registered password storage 14 which is used in this modification. The registered password storage 14 stores passwords in correspondence with their access levels. For example, the password A has an access level "9" and the password B has an access level "3". FIG. 9 shows a command table which is used in this modification. As shown, the commands "1" and "4" have an access level "9" and the commands "2" and "3" have an access level "3".

According to this modification, the password itself is not stored in the command table 8. For this reason, it is possible to prevent easy access to the passwords and accordingly improve the security of the system.

Further, the present invention is not limited to these embodiments, but various variations and modifications may be made without departing from the scope of the invention.

What is claimed is:

1. A command file processing system comprising:
   input means for inputting a password and arbitrary commands which are to be executed subsequently;
   a command table which prestores command names and corresponding passwords authorized to execute commands corresponding to the command names;
   command file creating means, coupled to said input means, for creating a command file by registering the commands which are to be executed subsequently in the command file; and
   judging means coupled to said input means, said command table and said command file creating means, for judging, prior to execution of the command file, whether or not the password input from said input means has authority to execute an arbitrary command which is to be registered in the command file when registering the arbitrary commands in the command file, based on the prestored command names and the corresponding passwords,
   said judging means including means for controlling said command file creating means to reject the registration of the arbitrary command in the command file when the password has no authority to execute the arbitrary command.

2. The command file processing system as claimed in claim 1, further comprising storage means, coupled to said judging means, for prestoring passwords in correspondence with access levels.

3. The command file processing system as claimed in claim 1, which further comprises means, coupled to said input means and said command table, for executing a certain command which is input from said input means when the password input from said input means has authority to execute the certain command based on contents of said command table.

4. The command file processing system as claimed in claim 1, which further comprises means, coupled to said input means, for executing a certain command file which is specified from said input means only when a certain password is input from said input means.

5. The command file processing system as claimed in claim 1, which further comprises a command file storage, coupled to said command file creating means and said judging means, for storing the command file which is created by said command file creating means, said command file storage including:
   a first storage part for storing a password which is used at a time when the command file is created by said command file creating means, and
   a second storage part for storing each command which the password input from said input means has authority to execute, to be registered in the command file when registering the commands in the command file.

6. The command file processing system as claimed in claim 5, which further comprises means, coupled to said input means and said command file storage, for preventing execution of the command file when the password input from said input means differs from the password stored in said first storage part.

7. The command file processing system as claimed in claim 5, further comprising means, coupled to said judging means for assigning to a predetermined password which is other than the password stored in said first storage part, authority to execute a certain command file, said command file storage further including a third storage part for storing the predetermined password.

8. The command file processing system as claimed in claim 7, which further comprises means, coupled to said input means and said command file storage, for executing the certain command file which is specified from said input means when the password input from said input means is the same as the password stored in one of said first and third storage parts.

9. A command file authorizing system comprising:
   input means for inputting a password and arbitrary commands which are to be executed subsequently;
   a command table which prestores command names and corresponding passwords authorized to execute commands corresponding to the command names;
   command file creating means, coupled to said input means, for creating a command file by registering the commands which are to be executed subsequently in the command file;
   judging means coupled to said input means, said command table and said command file creating means, for judging, prior to execution of the command file, whether or not the password input from said input means has authority to execute an arbitrary command which is to be registered in the command file when registering the arbitrary commands in the command file, based on the prestored command names and corresponding passwords; and
   a command file storage, coupled to said command file creating means and said judging means, for storing the command file which is created by said command file creating means, said command file storage including:
   a first storage part for storing a password which is used at a time when the command file is created by said command file creating means, and
   a second storage part for storing each command which the password input from said input means has authority to execute, to be registered in the command file when registering the commands in the command file.

10. The command file authorizing system as claimed in claim 9, further comprising means, coupled to said judging means, for assigning to a predetermined password which is other than the password stored in said first storage part, authority to execute a certain command file, said command file storage further including a third storage part for storing the predetermined password.

11. The command file authorizing system as claimed in claim 10, which further comprises means, coupled to said input means and said command file storage, for permitting execution of the certain command file which is specified from said input means is the same as the password stored in one of said first and third storage parts.

12. A computer implemented command file processing method comprising the steps of:
   (a) inputting a password and arbitrary commands which are to be executed subsequently;
   (b) storing command names and corresponding passwords authorized to execute commands corresponding to the command names, in a command table;
   (c) creating a command file by registering the commands which are to be executed subsequently in the command file;
   (d) judging, prior to execution of the command file, whether or not the input password has authority to execute an arbitrary command which is to be registered in the command file, when registering the commands in the command file, based on the command names and the corresponding passwords; and
   (e) rejecting the registration of the arbitrary command in the command filed when the password has no authority to execute the arbitrary command.

13. The computer implemented command file processing method as claimed in claim 12, wherein said step (b) comprises prestoring the command names and corresponding passwords.

14. The computer implemented command file processing method as claimed in claim 12, wherein said step (b) comprises prestoring the command names in correspondence with access levels of passwords authorized to execute the commands.

15. The command file processing method as claimed in claim 12, which further comprises the step of executing a certain command which is input when the input password has authority to execute the certain command based on contents of said command table.

16. The command file processing method as claimed in claim 12, which further comprises the step of executing a certain command file which is specified only when a certain password is input.

17. The computer implemented command file processing method as claimed in claim 12, which further comprises the steps of:
   storing the command file which is created in a command file storage,
   storing a password which is used at a time when the command file is created in a first storage part of the command file storage, and
   storing each command which the input password has authority to execute in a second storage part of the command file storage to be registered in the command file, when registering the commands in the command file.

18. The command file processing method as claimed in claim 12, which further comprises the step of preventing execution of the command file when the input password differs from the password stored in the first storage part.

19. The computer implemented command file processing method as claimed in claim 17, which further comprises the steps of:
   assigning to a predetermined password which is other than the password stored in the first storage part authority to execute a certain command file, and
   storing the predetermined password in a third storage part of the command file storage.

20. The command file processing method as claimed in claim 19, which further comprises the step of:
   executing the certain command file which is specified when the input password is the same as the password stored in one of the first and third storage parts.

* * * * *

UNITED STATES PATENT AND TRADEMARK OFFICE
CERTIFICATE OF CORRECTION

PATENT NO. : 5,218,701  Page 1 of 2
DATED : JUNE 8, 1993
INVENTOR(S) : TAKAHIRO MIYAZAKI It is certified that error appears in the above-indentified patent and that said Letters Patent is hereby corrected as shown below:

[57] ABSTRACT line 6, "A command made up of the commands are to be exe-" should be --A command file creating part creates a command file which is made up of the commands which are to be exe- --.

Col. 7, line 12, "part 2." should be --part 92.--.

Col. 9, line 32, "the and" should be --the command file within the command file creating part 4, and--.

Col. 13, line 66, "means is" should be --means when the password input from said input means is--.

UNITED STATES PATENT AND TRADEMARK OFFICE
CERTIFICATE OF CORRECTION

PATENT NO. : 5,218,701
DATED : June 8, 1993
INVENTOR(S) : TAKAHIRO MIYAZAKI

It is certified that error appears in the above-indentified patent and that said Letters Patent is hereby corrected as shown below:

COLUMN 14, line 18, "filed" should be --file--.

Signed and Sealed this

Twelfth Day of April, 1994

Attest:

Attesting Officer

BRUCE LEHMAN

Commissioner of Patents and Trademarks